(12) United States Patent
Koreishi

(10) Patent No.: US 10,889,330 B2
(45) Date of Patent: Jan. 12, 2021

(54) VEHICLE-BODY UPPER STRUCTURE

(71) Applicant: TOYOTA JIDOSHA KABUSHIKI KAISHA, Toyota (JP)

(72) Inventor: Norimasa Koreishi, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 189 days.

(21) Appl. No.: 16/157,846

(22) Filed: Oct. 11, 2018

(65) Prior Publication Data

US 2019/0126988 A1 May 2, 2019

(30) Foreign Application Priority Data

Oct. 26, 2017 (JP) ................................. 2017-207158

(51) Int. Cl.
  *B62D 25/06* (2006.01)
  *B62D 27/02* (2006.01)
  *B62D 25/02* (2006.01)

(52) U.S. Cl.
  CPC ............. *B62D 25/06* (2013.01); *B62D 25/02* (2013.01); *B62D 27/02* (2013.01)

(58) Field of Classification Search
  CPC .................................. B62D 25/06; B62D 27/02
  USPC ........................................................... 296/210
  See application file for complete search history.

(56) References Cited

U.S. PATENT DOCUMENTS

| | | | | |
|---|---|---|---|---|
| 5,318,338 A * | 6/1994 | Ikeda | ...................... | B62D 25/06 296/203.03 |
| 5,873,618 A * | 2/1999 | Ejima | ...................... | B62D 25/04 296/30 |
| 7,883,142 B2 * | 2/2011 | Hosaka | ................... | B62D 25/06 296/191 |
| 7,900,997 B2 * | 3/2011 | Hosaka | ................... | B62D 25/07 296/193.12 |
| 8,123,286 B2 * | 2/2012 | Furusako | ............... | B62D 25/06 296/203.03 |

(Continued)

FOREIGN PATENT DOCUMENTS

| | | | | |
|---|---|---|---|---|
| CA | 2685176 A1 * | 2/2009 | ............. | B62D 25/06 |
| CA | 2695925 A1 * | 5/2009 | ........... | B62D 21/157 |

(Continued)

OTHER PUBLICATIONS

Partial Translation of Oct. 27, 2020 Office Action issued in Japanese Patent Application No. 2017-207158.

*Primary Examiner* — Hilary L Gutman
(74) *Attorney, Agent, or Firm* — Oliff PLC

(57) ABSTRACT

A vehicle-body upper structure includes a roof panel constituting an outer plate of a vehicle-body upper part, a roof side reinforcement provided below, in a vehicle up-down direction, an outer region of the roof panel in the vehicle width direction, and a roof side rail provided in an outer end portion, in the vehicle width direction, of the vehicle-body upper part so as to extend along a vehicle front-rear direction. The roof panel includes an outer joining portion in an outer end portion of the roof panel in a vehicle width direction. The roof side reinforcement includes a rail joining portion and a roof joining portion, and the roof joining portion is joined to a predetermined part of the roof panel. The roof side rail is joined to the outer joining portion of the roof panel and the rail joining portion of the roof side reinforcement.

8 Claims, 7 Drawing Sheets

(56) References Cited

U.S. PATENT DOCUMENTS

| | | | |
|---|---|---|---|
| 8,210,602 B2* | 7/2012 | Kobayashi | B62D 25/06 296/187.12 |
| 8,915,540 B2* | 12/2014 | Nishimura | B62D 25/06 296/210 |
| 8,944,494 B2* | 2/2015 | Nakamura | B62D 25/04 296/193.06 |
| 9,394,018 B2* | 7/2016 | Kisaku | B62D 25/06 |
| 9,567,012 B2* | 2/2017 | Oshima | B62D 25/02 |
| 9,708,008 B2* | 7/2017 | Nishimura | B62D 25/04 |
| 9,764,770 B2* | 9/2017 | Nakanishi | B62D 25/04 |
| 9,828,035 B1* | 11/2017 | Sassi | B60K 1/04 |
| 9,944,329 B2* | 4/2018 | Sahi | B62D 25/06 |
| 2005/0253422 A1* | 11/2005 | Tomozawa | B62D 25/06 296/203.03 |
| 2006/0055209 A1* | 3/2006 | Hoshino | B62D 25/06 296/203.03 |
| 2008/0122259 A1* | 5/2008 | Matsui | B62D 25/06 296/187.12 |
| 2013/0320716 A1 | 12/2013 | Nishimura et al. | |
| 2014/0028057 A1 | 1/2014 | Nishimura et al. | |
| 2014/0225399 A1* | 8/2014 | Ono | B62D 25/06 296/210 |
| 2015/0137563 A1 | 5/2015 | Eberle et al. | |
| 2015/0367794 A1* | 12/2015 | Nishimura | B62D 25/06 296/187.13 |
| 2018/0148102 A1* | 5/2018 | Sato | B62D 25/04 |
| 2018/0170451 A1* | 6/2018 | Terada | B60J 5/045 |
| 2018/0237074 A1* | 8/2018 | Yoshitake | B62D 21/157 |
| 2019/0047627 A1* | 2/2019 | Terada | B60R 13/025 |
| 2019/0283808 A1* | 9/2019 | Kreuzer | B62D 27/065 |

FOREIGN PATENT DOCUMENTS

| | | | | |
|---|---|---|---|---|
| CA | 2840753 A1 * | 1/2013 | | B62D 25/02 |
| DE | 19638156 A1 * | 3/1997 | | B62D 25/04 |
| DE | 19915546 A1 * | 10/2000 | | B62D 25/06 |
| EP | 2420432 A1 * | 2/2012 | | B62D 25/04 |
| EP | 3006309 A1 * | 4/2016 | | B62D 25/00 |
| JP | S63-063267 U | 4/1988 | | |
| JP | 06127433 A * | 5/1994 | | |
| JP | 2007-313963 A | 12/2007 | | |
| JP | 2011-057146 A | 3/2011 | | |
| JP | 2013233918 A * | 11/2013 | | B62D 25/04 |
| JP | 2015-067159 A | 4/2015 | | |
| JP | 2015093643 A * | 5/2015 | | B62D 25/04 |
| JP | 2015-116869 A | 6/2015 | | |
| JP | 2016-078580 A | 5/2016 | | |
| JP | 2017-105325 A | 6/2017 | | |
| KR | 2002087149 A * | 11/2002 | | |
| WO | WO-2009020224 A1 * | 2/2009 | | B62D 25/06 |
| WO | WO-2013047547 A1 * | 4/2013 | | B62D 25/06 |
| WO | WO-2015076195 A1 * | 5/2015 | | B62D 27/02 |

* cited by examiner

VEHICLE-BODY UPPER STRUCTURE

INCORPORATION BY REFERENCE

The disclosure of Japanese Patent Application No. 2017-207158 filed on Oct. 26, 2017 including the specification, drawings and abstract is incorporated herein by reference in its entirety.

BACKGROUND

1. Technical Field

The disclosure relates to a vehicle-body upper structure.

2. Description of Related Art

In a vehicle-body upper structure described in Japanese Unexamined Patent Application Publication No. 2017-105325 (JP 2017-105325 A), a reinforcing plate is attached to a surface of a roof panel, the surface facing on a vehicle cabin side. The attachment of the reinforcing plate makes it possible to secure rigidity necessary for a roof portion of a vehicle even if the thickness of the roof panel is reduced, so as to achieve a reduction in weight of the vehicle.

SUMMARY

However, in the structure in JP 2017-105325 A, the reinforcing plate cannot be attached to the vicinity of an outer end portion of the roof panel in the vehicle width direction. Accordingly, if the thickness of the roof panel is reduced, strength and rigidity of the vicinity of the outer end portion of the roof panel in the vehicle width direction (an outer region thereof in the vehicle width direction) might become insufficient. Accordingly, it is hard to reduce the weight of the roof panel.

The disclosure provides a vehicle-body upper structure that can easily reduce the weight of a roof panel by supplementing strength and rigidity of an outer region of a roof panel in the vehicle width direction, thereby making it possible to achieve a reduction in weight of a vehicle.

A first aspect of the present disclosure relates to a vehicle-body upper structure. The vehicle-body upper structure includes a roof panel, a roof side reinforcement, and a roof side rail. The roof panel constitutes an outer plate of a vehicle-body upper part and includes an outer joining portion in an outer end portion of the roof panel in the vehicle width direction. The roof side reinforcement is provided below, in the vehicle up-down direction, an outer region of the roof panel in the vehicle width direction. The roof side reinforcement includes a rail joining portion and a roof joining portion. The roof joining portion is joined to a predetermined part of the roof panel. The roof side rail is provided in an outer end portion, in the vehicle width direction, of the vehicle-body upper part so as to extend along the vehicle front-rear direction. The roof side rail is joined to the outer joining portion of the roof panel and the rail joining portion of the roof side reinforcement.

With the first aspect, strength and rigidity of the outer region of the roof panel in the vehicle width direction can be supplemented. Accordingly, the roof panel can be easily reduced in weight.

In the first aspect, the predetermined part of the roof panel may be distanced inwardly in the vehicle width direction from the outer joining portion.

In the first aspect, the roof joining portion of the roof side reinforcement may be joined to the predetermined part of the roof panel that the predetermined part is distanced from the outer joining portion of the roof panel, and the rail joining portion of the roof side reinforcement may be joined to the roof side rail, so that a closed section including the roof side reinforcement and the roof panel is formed.

In the first aspect, a bending portion bending downward in the vehicle up-down direction may be formed in the outer region of the roof panel in the vehicle width direction, and the closed section formed by the roof side reinforcement may include the bending portion.

In the above configuration, the bending portion bending downward in the vehicle up-down direction is formed in the outer region of the roof panel in the vehicle width direction (in the vicinity of the outer end portion thereof in the vehicle width direction). Generally, when the roof panel is thinned, strength of the bending portion easily becomes a problem. In this regard, in the above configuration, the closed section formed by the roof side reinforcement includes the bending portion. On this account, with the configuration, strength and rigidity of the bending portion of the roof panel can be supplemented. Accordingly, a weight reduction of the roof panel can be easily attained in the vehicle-body upper structure (a vehicle with a structure) including the bending portion In the first aspect, the outer joining portion of the roof panel may be joined to the roof side rail at a position of the rail joining portion of the roof side reinforcement, so that the closed section is formed only by the roof panel and the roof side reinforcement.

With the configuration, strength of the outer region of the roof panel in the vehicle width direction can be supplemented effectively.

In the first aspect, a stiffening board may be joined to an intermediate region of the roof panel in the vehicle width direction.

With the configuration, rigidity of the intermediate region of the roof panel in the vehicle width direction can be secured as well as the outer region of the roof panel in the vehicle width direction, so that the roof panel can be further easily reduced in weight.

In the first aspect, the stiffening board may be joined to the roof side reinforcement.

With the configuration, in comparison with a configuration in which the stiffening board is not joined to the roof side reinforcement, rigidity of the roof panel can be improved effectively. That is, the intermediate region, in the vehicle width direction, that is reinforced by the stiffening board is continuous with the outer region, in the vehicle width direction, that is reinforced by the roof side reinforcement, thereby making it possible to prevent a local decrease in rigidity in comparison with a case where they are separated (they are not continuous with each other).

In the first aspect, at a position of the roof joining portion of the roof side reinforcement, the roof panel, the roof side reinforcement, and the stiffening board may be put on top of one another and joined to each other.

With the configuration, in comparison with a configuration in which the joining position between the stiffening board and the roof side reinforcement is not at the position of the roof joining portion of the roof side reinforcement, the rigidity of the roof panel can be supplemented effectively.

In the first aspect, the vehicle-body upper structure may further include a front width-direction member and a rear width-direction member each configured to connect right and left roof side rails in the vehicle width direction, the front width-direction member and the rear width-direction member being placed sequentially from the front side in the vehicle front-rear direction. The roof side reinforcement may be joined to the front width-direction member at a first position inward of the rail joining portion in the vehicle width direction, and the rear width-direction member at a second position inward of the rail joining portion in the vehicle width direction.

In the above configuration, the roof side reinforcement has a structure bridged between the front width-direction member and the rear width-direction member in the vehicle front-rear direction. On this account, with the configuration, the rigidity of the vehicle-body upper structure is improved still more, thereby making it possible to further effectively restrain occurrence of noise and the like.

In the first aspect, a connecting portion positioned between the rail joining portion and the roof joining portion in the roof side reinforcement may have a generally linear shape on a section perpendicular to the vehicle front-rear direction.

With the configuration, deformation of the closed section formed by the roof side reinforcement is prevented effectively.

In the first aspect, the vehicle-body upper structure may further include a first width-direction member, a second width-direction member, and a third width-direction member each configured to connect right and left roof side rails in the vehicle width direction, the first width-direction member, the second width-direction member, and the third width-direction member being placed sequentially from the front side in the vehicle front-rear direction. The roof panel may be provided in a region from the first width-direction member to the third width-direction member. The roof side reinforcement may be provided only in a region where the roof panel has a larger curvature in a vehicle front view, out of a region from the first width-direction member to the second width-direction member and a region from the second width-direction member to the third width-direction member.

With the configuration, it is possible to restrain an increase in weight of the vehicle due to providing of a roof center reinforcement and to supplement strength and rigidity of the outer region of the roof panel in the vehicle width direction. That is, it is possible to supplement the strength and rigidity of the roof panel sufficiently.

In the first aspect, the length of the roof side reinforcement in the vehicle width direction may be shorter than a half of the length of the roof panel in the vehicle width direction.

As described above, the first aspect of the disclosure yields such an excellent effect that a roof panel is easily reduced in weight by supplementing strength and rigidity of an outer region of the roof panel in the vehicle width direction, thereby making it possible to achieve a reduction in weight of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

The following describes a vehicle 100 including a vehicle-body upper structure S1 of a first embodiment of the disclosure.

Note that an arrow FR in the figures indicates the front side in the vehicle front-rear direction, an arrow UP indicates the upper side in the vehicle up-down direction, an arrow RH indicates the right side in the vehicle width direction, and an arrow OUT indicates the outer side in the vehicle width direction. Further, hereinafter, in a case where a description is made by use of front and rear sides, up and down sides, and right and left sides without any special mention, they indicate the front and rear sides in the vehicle front-rear direction, the up and down sides in the vehicle up-down direction, and the right and left sides in the vehicle width direction.

Outline

Figure 1:
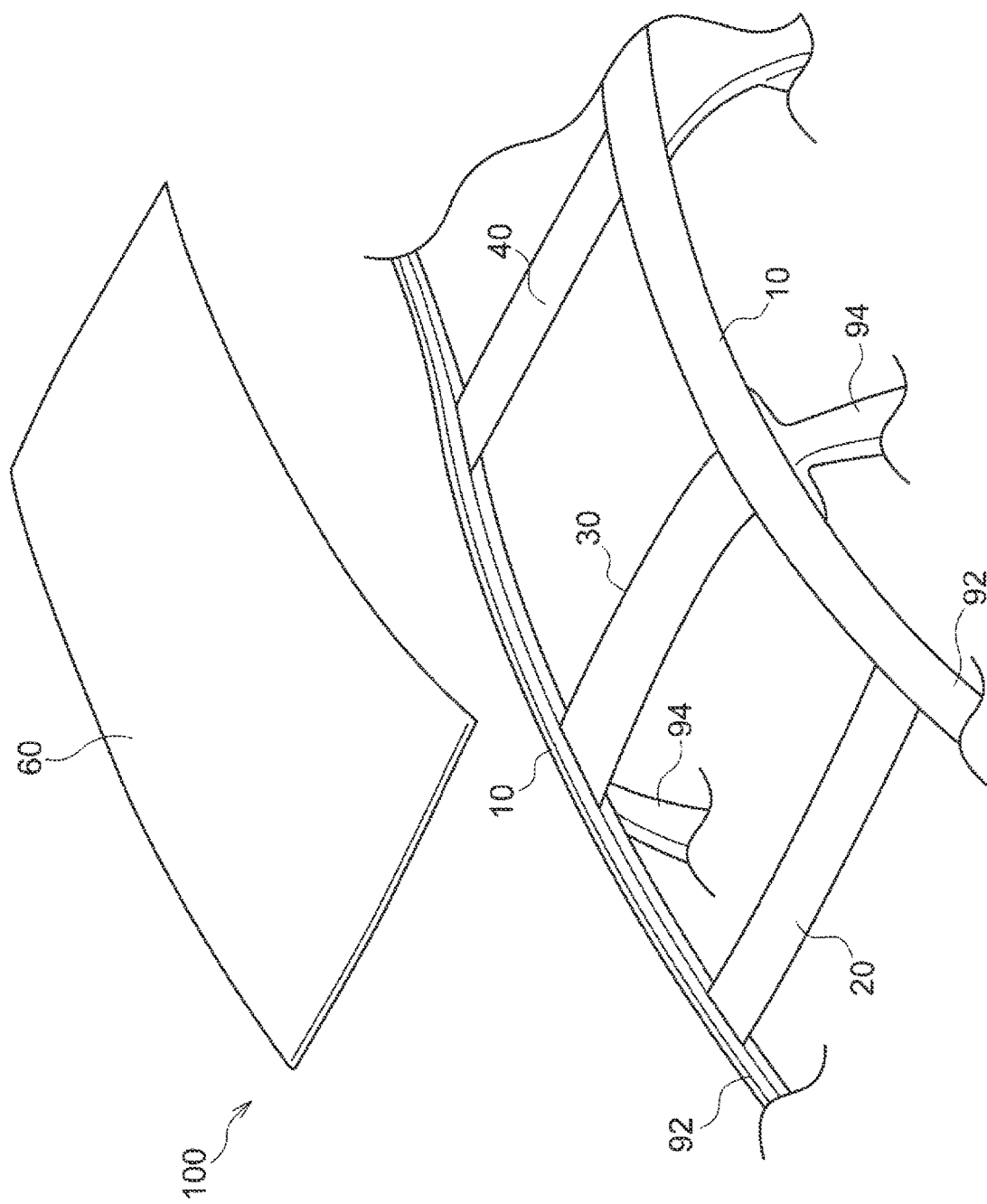
FIG. 1 is an exploded perspective view illustrating a roof panel, a roof side rail, and so on of a vehicle-body upper structure of a first embodiment (a roof side reinforcement and a stiffening board are not illustrated)
Figure 1:
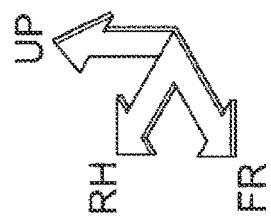

As illustrated in FIG. 1, a vehicle 100 includes right and left roof side rails 10. The roof side rail 10 is a vehicle body framework provided in an outer end portion, in the vehicle width direction, of a vehicle-body upper part so as to extend along the vehicle front-rear direction. An outer end portion of a roof panel 60 (described later) in the vehicle width direction is joined to the roof side rail 10. A front pillar 92 that supports a windshield glass (not shown) is formed on the front side of the roof side rail 10 continuously therewith. The roof side rail 10 has a slightly curved shape so as to project upward in the vehicle up-down direction.

Further, the vehicle 100 includes a front header 20 as a "first width-direction member." The front header 20 connects front end portions of the right and left roof side rails 10 to each other in the vehicle width direction. Further, the vehicle 100 includes a rear header 40 as a "third width-direction member." The rear header 40 connects rear end portions of the right and left roof side rails 10 to each other in the vehicle width direction. Furthermore, the vehicle 100 includes a roof center RF 30 (a roof center reinforcement 30) as a "second width-direction member." The roof center RF 30 (the roof center reinforcement 30) is provided between the front header 20 and the rear header 40, and connects respective intermediate portions, in the front-rear direction, of the right and left roof side rails 10 to each other in the vehicle width direction. A position, in the vehicle front-rear direction, in the roof side rail 10 at which the roof center RF 30 (the roof center reinforcement 30) is provided is generally at the same position as a position where center pillars 94 (B-pillars) are provided in side portions of the vehicle so as to extend along the vehicle up-down direction. Further, in a case where the roof center RF 30 is used without any special mention in the following description, the roof center RF 30 indicates the roof center reinforcement 30.

A roof side RF 50 (a roof side reinforcement 50), the roof panel 60, and a stiffening board 70 are attached to the above structure. The order of attachment is as follows. Further, in a case where the roof side RF 50 is used without any special mention in the following description, the roof side RF 50 indicates the roof side reinforcement 50.

Figure 2:
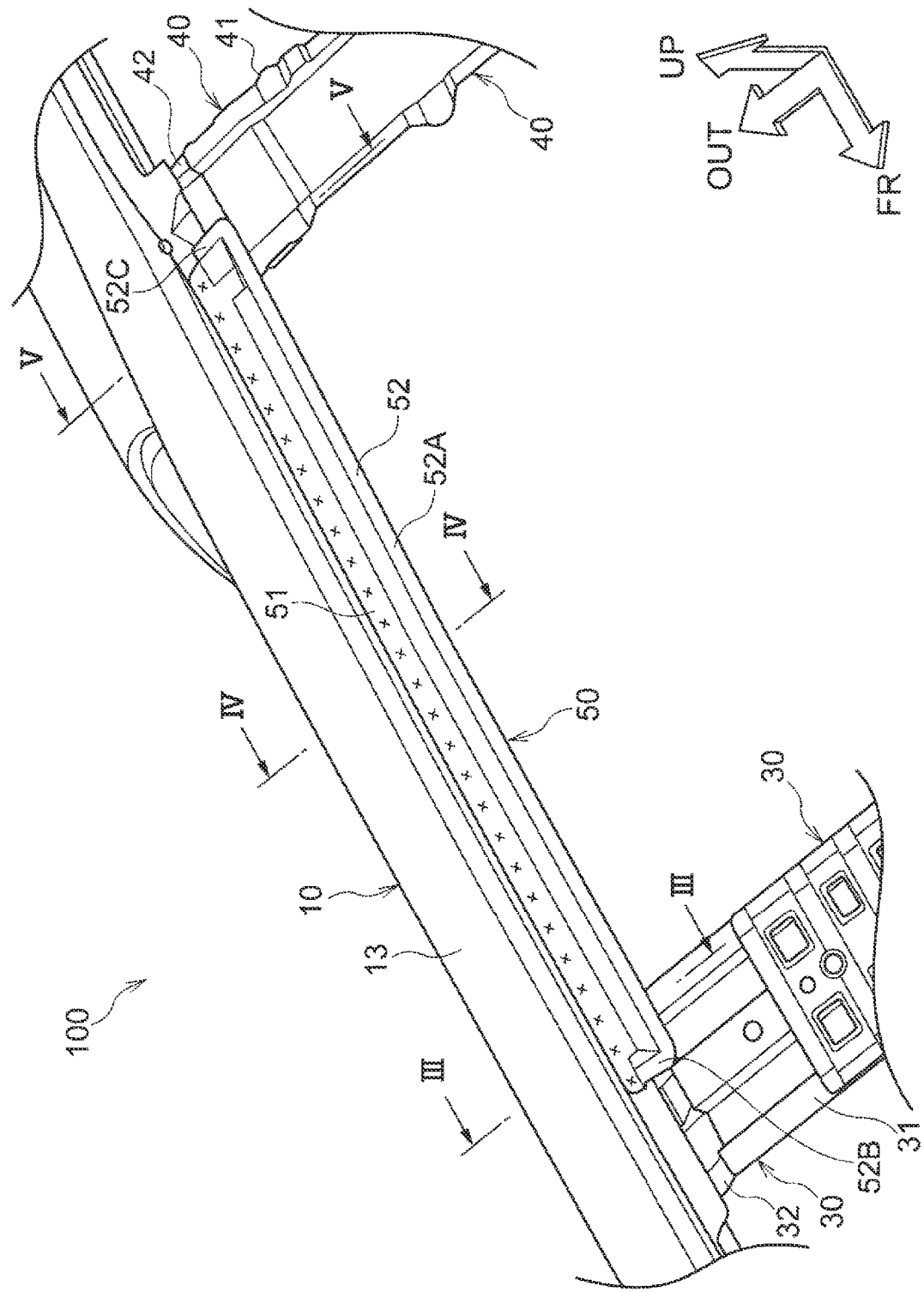
FIG. 2 is an enlarged perspective view illustrating a state where the roof side reinforcement is joined to the roof side rail.

First, a pair of right and left roof side RFs 50 is attached. FIG. 2 illustrates a state where the roof side RF 50 is attached (a state before the roof panel 60 and the stiffening board 70 are attached). As illustrated in FIG. 2, the roof side RF 50 is an elongated member and is joined to the roof side rail 10 with its longitudinal direction being along the vehicle front-rear direction. A part, of the roof side rail 10, to which the roof side RF 50 is joined is a part from the roof center RF 30 to the rear header 40, and the roof side RF 50 is not provided in a part from the front header 20 to the roof center RF 30. Further, a front end portion of the roof side RF 50 is joined to the roof center RF 30 and a rear end portion of the roof side RF 50 is joined to the rear header 40. Further, the roof side RF 50 is joined to the roof side rail 10 with its short direction being along the vehicle width direction. The length of the roof side RF 50 in the vehicle width direction is shorter than the lengths of the roof center RF 30 and the rear header 40 in the vehicle width direction. The length of the roof side RF 50 in the vehicle width direction is shorter than a half of the length of the roof panel 60 in the vehicle width direction.

Then, the roof panel 60 is attached from the upper side in the vehicle up-down direction. A region where the roof panel 60 is attached is a region between the right and left roof side RFs 50 and between the front header 20 and the rear header 40.

Finally, the stiffening board 70 is attached from the lower side in the vehicle up-down direction. A part where the stiffening board 70 is attached is a part from the roof center RF 30 to the rear header 40 (a part corresponding to a part between the right and left roof side RFs 50). The stiffening board 70 is joined to a bottom face of the roof panel 60 via an adhesive 84 (see FIG. 4) and is also joined to the roof side RF 50, the roof center RF 30, and the rear header 40 via the adhesive 84 (see FIGS. 3 to 5).

Details

The following describes a detailed structure of the vehicle-body upper structure S1.

Figure 3:
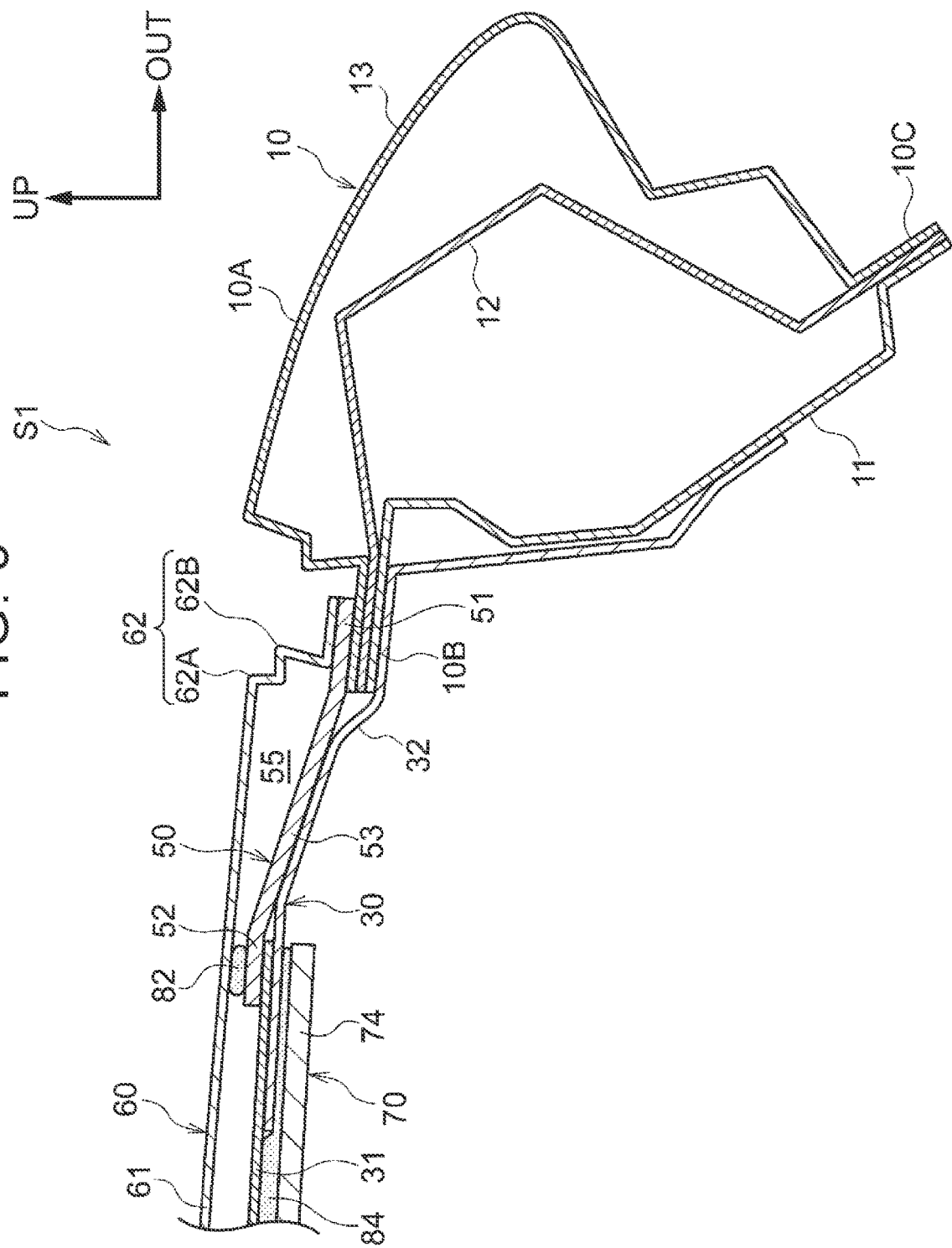
FIG. 3 is a sectional view (a sectional view along a line III-III in FIG. 2) at a position of a front end portion of the roof side reinforcement.
Figure 4:
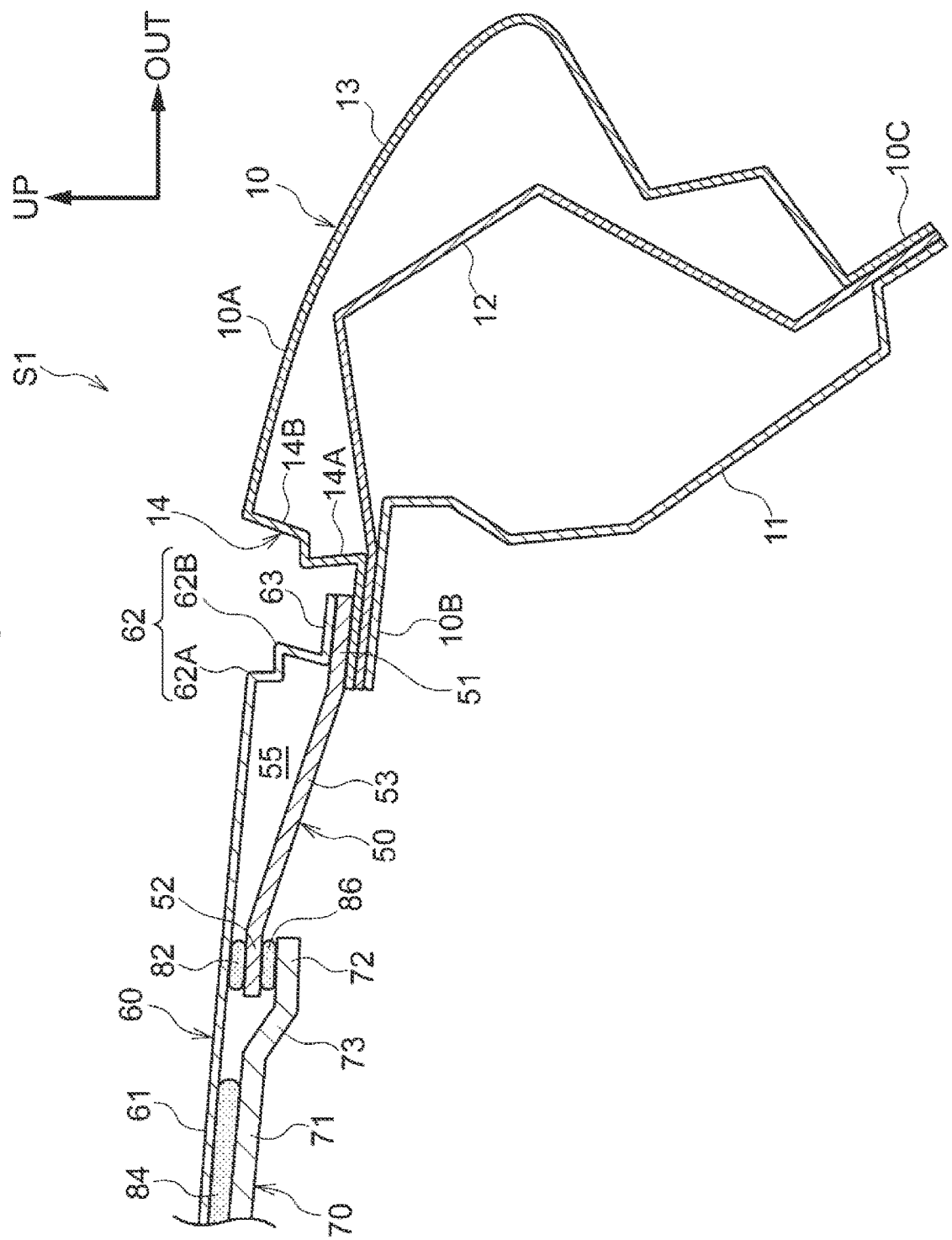
FIG. 4 is a sectional view (a sectional view along a line IV-IV in FIG. 2) at a position of an intermediate portion of the roof side reinforcement in its front-rear direction.
Figure 5:
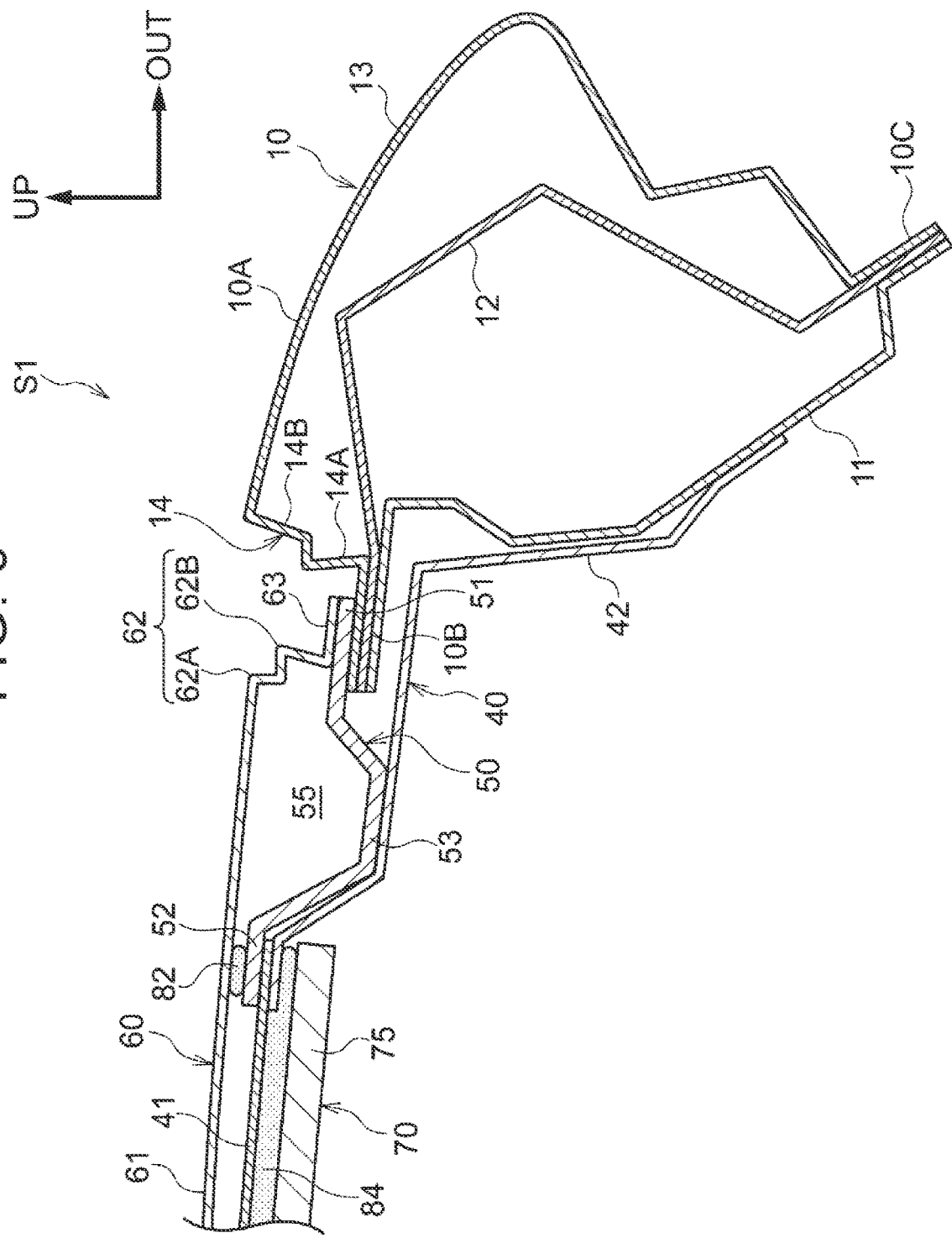
FIG. 5 is a sectional view (a sectional view along a line V-V in FIG. 2) at a position of a rear end portion of the roof side reinforcement.

FIGS. 3 to 5 are sectional views each illustrating a state where the vehicle-body upper structure S1 is cut along a plane perpendicular to the vehicle front-rear direction. Among them, FIG. 3 is a sectional view at a position of the roof center RF 30 (a sectional view taken along a line III-III in FIG. 2), FIG. 4 is a sectional view of the vehicle 100 at a position between the roof center RF 30 and the rear header 40 (a sectional view taken along a line IV-IV in FIG. 2), and FIG. 5 is a sectional view at a position of the rear header 40 (a sectional view taken along a line V-V in FIG. 2).

As illustrated in FIGS. 3 to 5, the roof side rail 10 includes an inner rail 11, an outer rail 12, and a side member outer 13. The roof side rail 10 includes an inner flange portion 10B and an outer flange portion 10C joined in a state where the inner rail 11, the outer rail 12, and the side member outer 13 are put on top of one another. Hereby, the roof side rail 10 includes a closed section portion 10A formed as a closed-section structure by the inner rail 11 and the side member outer 13, the inner flange portion 10B projecting inwardly in the vehicle width direction from a part of the closed section portion 10A on the upper side and the inner side in the vehicle width direction, and the outer flange portion 10C projecting diagonally downward and outward in the vehicle width direction from a part of the closed section portion 10A on the lower side and the outer side in the vehicle width direction. The outer rail 12 divides a closed section of the closed section portion 10A into two closed sections.

The inner flange portion 10B is configured such that the inner rail 11, the outer rail 12, and the side member outer 13 are sequentially put on top of one another from the lower side in the vehicle up-down direction. The inner flange portion 10B has a plate-thickness direction generally along the vehicle up-down direction and extends along the vehicle front-rear direction.

The roof side RF 50 includes a rail joining portion 51 joined to the roof side rail 10. As illustrated in FIG. 2, the rail joining portion 51 is formed in a region provided in an outer end portion of the roof side RF 50 in the vehicle width direction so as to extend in the vehicle front-rear direction. The rail joining portion 51 is put on the inner flange portion 10B of the roof side rail 10 from the upper side in the vehicle up-down direction and joined thereto by welding such as resistance spot welding.

Further, the roof side RF 50 includes a roof joining portion 52 joined to the roof panel 60. The roof joining portion 52 is joined to the bottom face of the roof panel 60 via an adhesive 82 such as a mastic sealer. As illustrated in FIG. 2, the roof joining portion 52 is constituted by an inner roof joining portion 52A formed in a region provided in an inner end portion of the roof side RF 50 in the vehicle width direction so as to extend in the vehicle front-rear direction, a front roof joining portion 52B formed in a region extending outwardly in the vehicle width direction from a front end of the inner roof joining portion 52A, and a rear roof joining portion 52C formed in a region extending outwardly in the vehicle width direction from a rear end of the inner roof joining portion 52A. When the roof panel 60 is placed from the upper side in the vehicle up-down direction in a state where the adhesive 82 is placed on a top face of the roof joining portion 52, the top face of the roof joining portion 52 is joined to the bottom face of the roof panel 60 via the adhesive 82.

FIG. 4 illustrates a section at a position of the intermediate portion of the roof side RF 50 in the front-rear direction. As illustrated in FIG. 4, at the position of the intermediate portion of the roof side RF 50 in the front-rear direction, the roof side RF 50 includes the rail joining portion 51 placed with its plate-thickness direction being generally along the vehicle up-down direction, the roof joining portion 52 placed above the rail joining portion 51 with its plate-thickness direction being along the vehicle up-down direction, and a connecting portion 53 configured to connect the rail joining portion 51 to the roof joining portion 52. The connecting portion 53 extends in a direction inclined from the vehicle width direction and linearly connects the rail joining portion 51 to the roof joining portion 52 in the direction inclined from the vehicle width direction.

As illustrated in FIGS. 2 and 3, the roof center RF 30 is configured such that a body member 31 constituting a central portion of the roof center RF 30 in the vehicle width direction is joined to an extension member 32 constituting an outer portion thereof in the vehicle width direction. The body member 31 is an elongated member placed with its longitudinal direction being along the vehicle width direction. The extension member 32 is joined to an outer end portion of the body member 31 in the vehicle width direction and is joined to the inner rail 11 of the roof side rail 10, so as to support the body member 31.

FIG. 3 illustrates a section at a position of the front end portion of the roof side RF 50. As illustrated in FIG. 3, the front end portion of the roof side RF 50 is placed on the upper side of the roof center RF 30. At the position of the front end portion of the roof side RF 50, the roof side RF 50 includes the rail joining portion 51 placed with its plate-thickness direction being generally along the vehicle up-down direction, the roof joining portion 52 placed above the rail joining portion 51 with its plate-thickness direction being along the vehicle up-down direction, and the connecting portion 53 configured to connect the rail joining portion 51 to the roof joining portion 52. The connecting portion 53 extends in the direction inclined from the vehicle width direction and linearly connects the rail joining portion 51 to the roof joining portion 52 in the direction inclined from the vehicle width direction. The extension member 32 of the roof center RF 30 is put on a bottom face of the connecting portion 53 and joined thereto by welding such as resistance spot welding.

As illustrated in FIGS. 2 and 5, the rear header 40 is configured such that a body member 41 constituting a central portion of the rear header 40 in the vehicle width direction is joined to an extension member 42 constituting an outer portion thereof in the vehicle width direction. The body member 41 is an elongated member placed with its longitudinal direction being along the vehicle width direction. The extension member 42 is joined to an outer end portion of the body member 41 in the vehicle width direction and is joined to the inner rail 11 of the roof side rail 10, so as to support the body member 41.

FIG. 5 illustrates a section at a position of the rear end portion of the roof side RF 50. As illustrated in FIG. 5, the rear end portion of the roof side RF 50 is put on the upper side of the rear header 40 and joined to the rear header 40. More specifically, at the position of the rear end portion of the roof side RF 50, the roof side RF 50 is configured such that the rail joining portion 51 in the outer end portion in the vehicle width direction is joined to a top face of the inner flange portion 10B of the roof side rail 10 and is joined to an outer joining portion 63 of the roof panel 60, and the roof joining portion 52 in the inner end portion in the vehicle width direction is joined to the bottom face of the roof panel 60 and is joined to a top face of the rear header 40. Further, the roof side RF 50 is configured such that a part (the connecting portion 53) between the rail joining portion 51 and the roof joining portion 52 is also joined to the rear header 40. In the roof joining portion 52 of the roof side RF 50, the roof panel 60, the roof side RF 50, the body member 41 of the rear header 40, and the extension member 42 of the rear header 40 are put on top of one another from the upper side in the vehicle up-down direction and joined to each other.

Further, as illustrated in FIG. 5, in the rear end portion of the roof side RF 50, the connecting portion 53 configured to connect the rail joining portion 51 to the roof joining portion 52 in the roof side RF 50 in the vehicle width direction has a shape projecting downward. A part, of the connecting portion 53, that is placed on the lowermost side in the vehicle up-down direction is joined on a top face of the extension member 42 of the rear header 40 by welding such as resistance spot welding.

As illustrated in FIGS. 3 to 5, the roof panel 60 includes a general portion 61 constituting a part other than ends of the roof panel 60, and an outer joining portion 63 constituting an outer end portion of the roof panel 60 in the vehicle width direction. The outer joining portion 63 is placed below, in the vehicle up-down direction, an outer end portion of the general portion 61 in the vehicle width direction. The outer end portion of the general portion 61 in the vehicle width direction and the outer joining portion 63 are connected to each other generally in the vehicle up-down direction via a bending portion 62. The outer joining portion 63 and the bending portion 62 are formed in a region provided in the outer end portion of the roof panel 60 in the vehicle width direction so as to extend in the vehicle front-rear direction.

More specifically, the bending portion 62 includes a first bending portion 62A formed in an outer end of the general portion 61 in the vehicle width direction, and a second bending portion 62B placed on a side closer to the outer joining portion 63 than the first bending portion 62A. The first bending portion 62A and the second bending portion 62B bend generally at a right angle, so that the bending portion 62 has a generally stepped shape on a section perpendicular to the vehicle front-rear direction. The bending portion 62 may be constituted only by the first bending portion 62A, or may further include a third bending portion placed on a side closer to the outer joining portion 63 than the second bending portion 62B.

The outer joining portion 63 of the roof panel 60 is placed on a top face of the rail joining portion 51 of the roof side RF 50. In this state, the roof panel 60 is joined to the roof side RF 50. This joining is achieved, for example, by laser beam welding such as laser peening. Hereby, the roof panel 60 is joined to the roof side rail 10 via the roof side RF 50.

Further, a vertical wall portion 14 is formed so as to extend upward in the vehicle up-down direction from an outer end, in the vehicle width direction, of the inner flange portion 10B of the roof side rail 10. The vertical wall portion 14 is formed as a part of the side member outer 13. More specifically, the vertical wall portion 14 includes a first vertical wall portion 14A extending upward from the outer end of the inner flange portion 10B in the vehicle width direction, and a second vertical wall portion 14B extending further upward from an upper end of the first vertical wall portion 14A via a stepped portion.

A recessed portion recessed downward in the vehicle up-down direction and extending in the vehicle front-rear direction is constituted by the bending portion 62 and the outer joining portion 63 of the roof panel 60 and the inner flange portion 10B and the vertical wall portion 14 of the roof side rail 10. A roof molding (not shown) is placed in the recessed portion.

As illustrated in FIG. 4, a general portion 71 of the stiffening board 70 is joined to the bottom face of the roof panel 60 via the adhesive 84. Further, a connecting portion 72 of the stiffening board 70 is joined to a bottom face of the roof joining portion 52 of the roof side RF 50 via an adhesive 86.

The general portion 71 of the stiffening board 70 is formed in a region other than front and rear ends and right and left ends of the stiffening board 70. The connecting portion 72 of the stiffening board 70 is formed in a region provided in an outer end portion of the stiffening board 70 in the vehicle width direction so as to extend in the vehicle front-rear direction. As illustrated in FIG. 4, the general portion 71 and the connecting portion 72 are connected via a displacement portion 73 displaced in the vehicle up-down direction. Hereby, the stiffening board 70 is joined to the bottom face of the roof panel 60 at the general portion 71 and is joined to a bottom face of the roof side RF 50 at the connecting portion 72. The connecting portion 72 may be joined to a bottom face of the rail joining portion 51 of the roof side RF 50 or may be joined to a bottom face of the inner flange portion 10B of the roof side rail 10.

As illustrated in FIG. 3, in the front end portion of the roof side RF 50, the roof panel 60, the roof side RF 50, the body member 31 of the roof center RF 30, the extension member 32 of the roof center RF 30, and the stiffening board 70 are sequentially put on top of one another from the upper side in the vehicle up-down direction and joined to each other at the position of the roof joining portion 52 of the roof side RF 50. The roof panel 60 and the roof side RF 50 are joined to each other via the adhesive 82 such as a mastic sealer, the roof side RF 50 and the roof center RF 30 are joined to each other by welding such as resistance spot welding, and the roof center RF 30 and the stiffening board 70 are joined to each other via the adhesive 84.

As illustrated in FIG. 3, the stiffening board 70 includes a front joining portion 74 joined to the roof center RF 30 from the lower side in the vehicle up-down direction via the adhesive 84. The front joining portion 74 is formed in a region provided in a front end portion of the stiffening board 70 so as to extend in the vehicle width direction.

As illustrated in FIG. 5, in the rear end portion of the roof side RF 50, the roof panel 60, the roof side RF 50, the body member 41 of the rear header 40, the extension member 42 of the rear header 40, and the stiffening board 70 are put on top of one another from the upper side in the vehicle up-down direction and joined to each other at the position of the roof joining portion 52 of the roof side RF 50. The roof panel 60 and the roof side RF 50 are joined to each other via the adhesive 82 such as a mastic sealer, the roof side RF 50 and the rear header 40 are joined to each other by welding such as resistance spot welding, and the roof center RF 30 and the stiffening board 70 are joined to each other via the adhesive 84.

As illustrated in FIG. 5, the stiffening board 70 includes a rear joining portion 75 joined to a bottom face of the rear header 40 via the adhesive 84. The rear joining portion 75 is formed in a region provided in a rear end portion of the stiffening board 70 so as to extend in the vehicle width direction.

The stiffening board 70 is a plate-shaped member configured to supplement rigidity of the roof panel 60 by being joined to the bottom face of the roof panel 60. The stiffening board 70 is made of cardboard or urethane, for example. The stiffening board 70 made of urethane is obtained such that plate-shaped urethane is coated with glass fiber, for example. The thickness of the stiffening board 70 is 5 mm to 20 mm, for example. Further, the mass of the stiffening board 70 per unit area (one meter square) is preferably less than 2000 g, and further preferably less than 1000 g. The stiffening board 70 made of cardboard can realize a thickness of 7.2 mm and a mass of about 1400 g per unit area, for example. Further, the stiffening board 70 made of urethane can realize a thickness of 13 mm and a mass of about 780 g per unit area, for example.

Effects

Next will be described the effects of the present embodiment.

In the present embodiment, the roof panel 60 constituting an outer plate of the vehicle-body upper part is configured such that the outer joining portion 63 placed in the outer end portion of the roof panel 60 in the vehicle width direction is joined to the roof side rail 10. Further, the roof side RF 50 is provided below, in the vehicle up-down direction, the vicinity of the outer end portion of the roof panel 60 in the vehicle width direction (the outer region thereof in the vehicle width direction). More specifically, the inner end portion (the roof joining portion 52) of the roof side RF 50 in the vehicle width direction is joined to a part, of the roof panel 60, distanced inwardly in the vehicle width direction from the outer joining portion 63, and the outer end portion (the rail joining portion 51) of the roof side RF 50 in the vehicle width direction is joined to the roof side rail 10. Hereby, a closed section 55 including the roof side RF 50 and the roof panel 60 is formed. On this account, even if the roof panel 60 is thinned, strength and rigidity of the vicinity of the outer end portion of the roof panel 60 in the vehicle width direction (the outer region thereof in the vehicle width direction) can be supplemented. Hereby, the roof panel 60 can be easily reduced in weight.

In the meantime, in the present embodiment, the bending portion 62 bending downward in the vehicle up-down direction is formed in the outer region of the roof panel 60 in the vehicle width direction. Accordingly, if the roof panel 60 is thinned, strength of the bending portion 62 might easily become a problem. However, in the present embodiment, the closed section 55 formed by the roof side RF 50 includes the bending portion 62. This can supplement the strength and rigidity of the bending portion 62 of the roof panel 60. Accordingly, a weight reduction of the roof panel 60 can be easily attained in the vehicle-body upper structure S1 (a vehicle with a structure) including the bending portion 62.

Further, in the present embodiment, the outer joining portion 63 of the roof panel 60 is joined to the roof side rail 10 at the position of the rail joining portion 51 of the roof side RF 50 (the outer end portion thereof in the vehicle width direction). Hereby, the closed section 55 is formed only by the roof panel 60 and the roof side RF 50. On this account, the strength of the outer region of the roof panel 60 in the vehicle width direction can be supplemented effectively.

Further, in the present embodiment, the stiffening board 70 is provided in an intermediate region of the roof panel 60 in the vehicle width direction. On this account, rigidity of the intermediate region of the roof panel 60 in the vehicle width direction can be secured as well as the outer region of the roof panel 60 in the vehicle width direction, and the roof panel 60 can be further easily reduced in weight. Note that the intermediate region in the vehicle width direction in the present embodiment may be a region from the center of the roof panel 60 in the vehicle width direction to parts distanced from the center by a predetermined distance toward a first end and a second end as outer ends of the roof panel 60 in the vehicle width direction. Further, the outer region in the vehicle width direction in the present embodiment may be a region including a part from the first end to an end, of the intermediate region in the vehicle width direction, on a side closer to the first end, and a part from the second end to an end, of the intermediate region in the vehicle width direction, on a side closer to the second end.

Further, in the present embodiment, the stiffening board 70 is joined to the roof side RF 50. On this account, in comparison with a configuration in which the stiffening board 70 is not joined to the roof side RF 50, the rigidity of the roof panel 60 can be improved effectively. That is, the intermediate region, in the vehicle width direction, that is reinforced by the stiffening board 70, is continuous with the outer region, in the vehicle width direction, that is reinforced by the roof side RF 50, thereby making it possible to prevent a local decrease in rigidity in comparison with a case where they are separated (they are not continuous with each other).

Further, in the present embodiment, at the position of the roof joining portion 52 of the roof side RF 50 (the inner end portion thereof in the vehicle width direction), the roof panel 60, the roof side RF 50, and the stiffening board 70 are put on top of one another and joined to each other. That is, a joining position between the stiffening board 70 and the roof side RF 50 is at the position of the roof joining portion 52 of the roof side RF 50. On this account, in comparison with a configuration in which the joining position between the stiffening board 70 and the roof side RF 50 is not at the position of the roof joining portion 52 of the roof side RF 50, the rigidity of the roof panel 60 can be supplemented effectively.

Figure 7A:
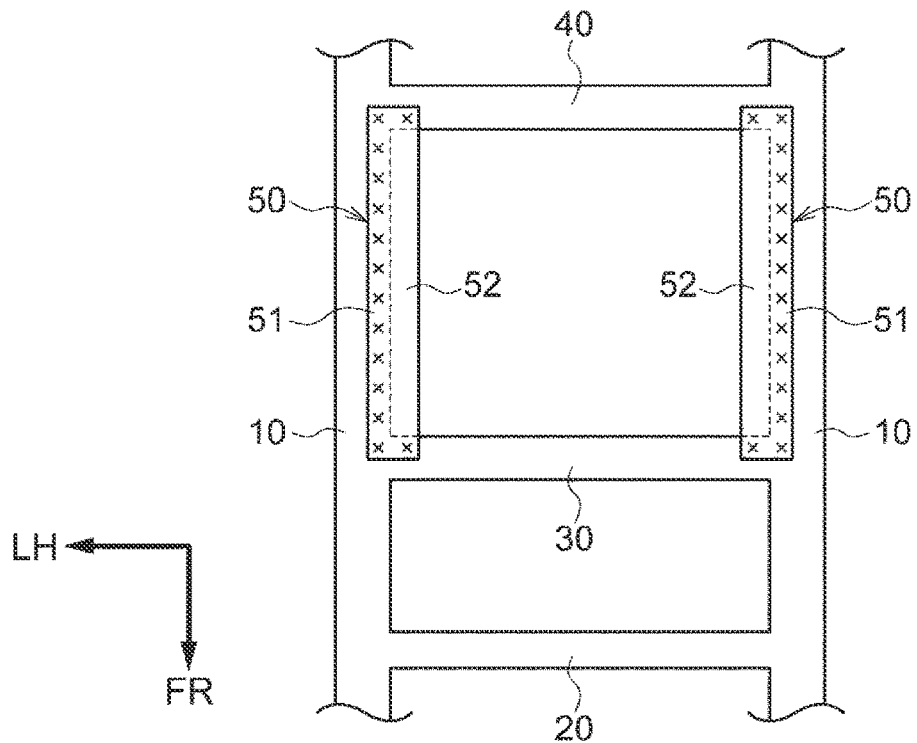
FIG. 7A is a schematic plan view in which the stiffening board and the roof panel are omitted in the vehicle-body upper structure of the first embodiment.

Further, in the present embodiment, as illustrated in FIGS. 3, 5, and 7A, the roof side RF 50 is joined to the roof center RF 30 and is also joined to the rear header 40 at a position inward of the rail joining portion 51 in the vehicle width direction. Hereby, the roof side RF 50 has a structure bridged between the roof center RF 30 and the rear header 40 in the vehicle front-rear direction. On this account, the rigidity of the vehicle-body upper structure S1 is improved still more, thereby making it possible to further effectively restrain occurrence of noise and the like.

Further, in the present embodiment, as illustrated in FIGS. 3 and 4, the connecting portion 53, of the roof side RF 50, positioned between the rail joining portion 51 and the roof joining portion 52 in the roof side RF 50 has a generally linear shape on a section perpendicular to the vehicle front-rear direction. That is, the closed section 55 is formed with a generally shortest distance by the roof side RF 50. On this account, deformation of the closed section 55 formed by the roof side RF 50 is prevented effectively. In the present embodiment, as illustrated in FIG. 5, at the position of the rear end portion of the roof side RF 50, the connecting portion 53, of the roof side RF 50, positioned between the rail joining portion 51 and the roof joining portion 52 in the roof side RF 50 is joined to the rear header 40, so that the connecting portion 53 does not have a generally linear shape on a section perpendicular to the vehicle front-rear direction. However, at the position of the rear end portion of the roof side RF 50, the connecting portion 53 of the roof side RF 50 may not necessarily be joined to the rear header 40, and the connecting portion 53 of the roof side RF 50 may have a generally linear shape on a section perpendicular to the vehicle front-rear direction.

Further, in the present embodiment, as illustrated in FIG. 2, the roof panel 60 is provided in the region from the front header 20 to the rear header 40. Further, the roof center RF 30 is provided between the front header 20 and the rear header 40, and a part, of the roof panel 60, corresponding to the region from the roof center RF 30 to the rear header 40 is formed with a larger curvature than a part, of the roof panel 60, corresponding to a region from the front header 20 to the roof center RF 30 in a vehicle front view. As illustrated in FIG. 7A, the roof side RF 50 is not provided between the front header 20 and the roof center RF 30 and is provided only between the roof center RF 30 and the rear header 40. That is, the roof center RF 30 divides a region where the roof panel 60 is provided (the region from the front header 20 to the rear header 40) into a front region and a rear region, and the roof side RF 50 is provided only in a region where the curvature of the roof panel 60 is larger, out of the front region and the rear region. On this account, it is possible to restrain an increase in weight of the vehicle due to providing of the roof center RF 30 and to supplement the rigidity of the roof panel 60. That is, it is possible to supplement the rigidity of the roof panel 60 sufficiently.

Furthermore, in the present embodiment, the stiffening board 70 is provided only in a region where the curvature of the roof panel 60 is larger and the roof side RF 30 is provided, out of the front region and the rear region divided by the roof center RF 30. This can also supplement the rigidity of the roof panel 60 sufficiently.

Second Embodiment

The following describes a second embodiment of the present disclosure.

Figure 6:
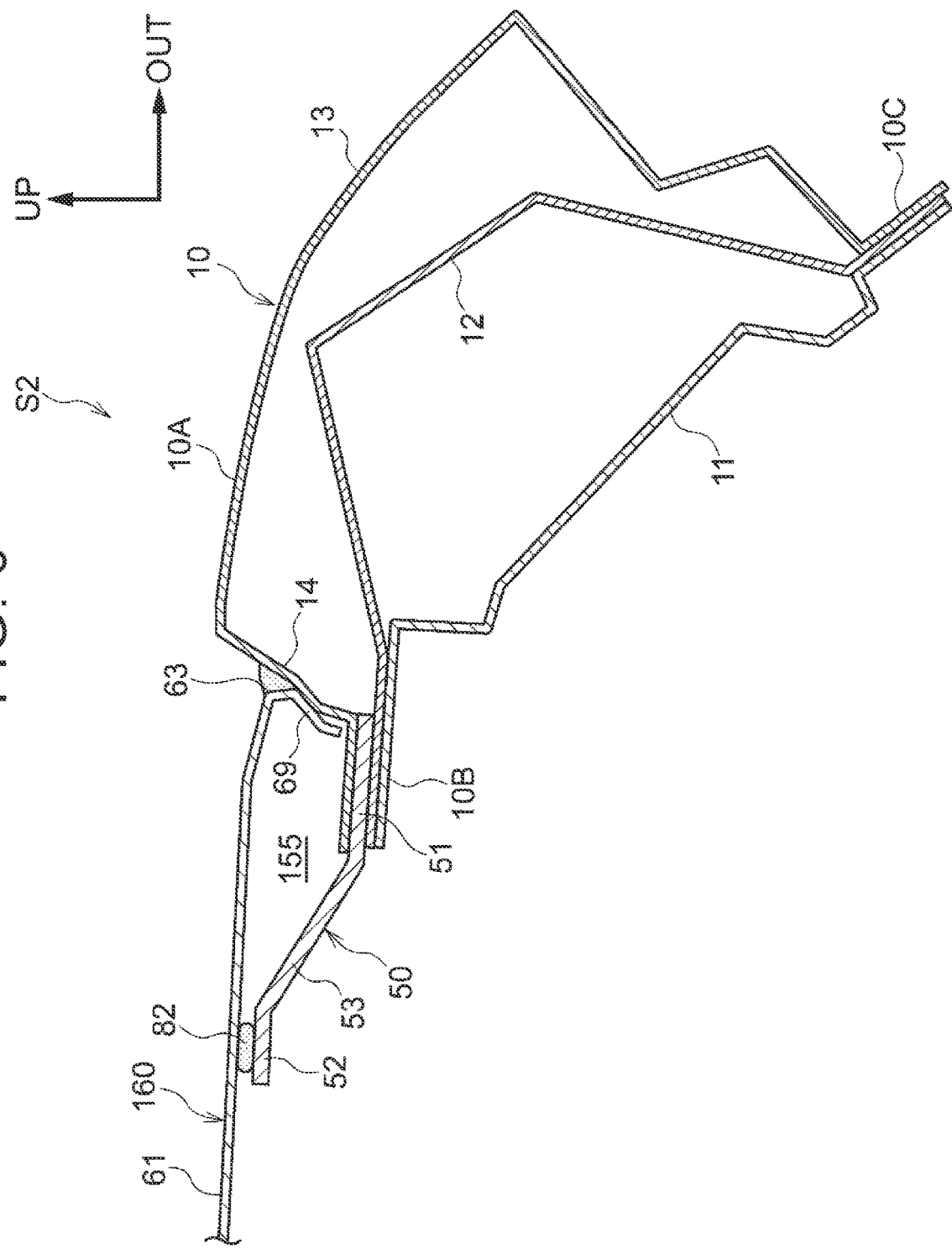
FIG. 6 is a sectional view illustrating a vehicle-body upper structure of a second embodiment and is a sectional view at an intermediate portion of a roof side reinforcement in its front-rear direction.

As illustrated in FIG. 6, a vehicle-body upper structure S2 of the second embodiment is obtained such that the disclosure is applied to a so-called laser brazing roof structure.

Differently from the roof panel 60 of the first embodiment, a roof panel 160 of the second embodiment does not include the bending portion 62 (see FIGS. 3 to 5). The roof panel 160 of the second embodiment includes a curved portion 69 provided in the vicinity of an outer end portion of the roof panel 160 in the vehicle width direction so as to curve downward in the vehicle up-down direction. An outer surface of the curved portion 69 is joined to the side member outer 13 of the roof side rail 10 by laser brazing. A part, of the curved portion 69 of the roof panel 160, that is joined to the roof side rail 10 serves as the outer joining portion 63. On this account, in the vehicle-body upper structure S2 of the second embodiment, a roof molding is not placed in a joining portion of the roof panel 160 with respect to the roof side rail 10. Further, a part to which the outer joining portion 63 of the roof panel 160 is joined is the vertical wall portion 14 of the roof side rail 10 and is not the inner flange portion 10B of the roof side rail 10.

The rail joining portion 51 of the roof side RF 50, provided in the outer end portion thereof in the vehicle width direction, is joined by welding to the inner flange portion 10B of the roof side rail 10, and the roof joining portion 52 provided in the inner end portion thereof in the vehicle width direction is joined to a bottom face of the general portion 61 of the roof panel 160 via the adhesive 82. Hereby, a closed section 155 is formed by the vicinity of the outer end portion of the roof panel 160 in the vehicle width direction (an outer region thereof in the vehicle width direction), the roof side RF 50, and the roof side rail 10. Note that, in FIG. 6, the rail joining portion 51 of the roof side RF 50 is placed between the side member outer 13 and the outer rail 12 in the inner flange portion 10B, but may be placed on a top face of the side member outer 13 in the inner flange portion 10B.

Effects

Next will be described the effects of the present embodiment. However, the description of the effects of the same configuration as the first embodiment is omitted appropriately.

In the present embodiment, the roof panel 160 constituting the outer plate of the vehicle-body upper part is joined to the roof side rail 10 in the outer joining portion 63 placed in the outer end portion of the roof panel 160 in the vehicle width direction. Further, the roof side RF 50 is provided below, in the vehicle up-down direction, the vicinity of the outer end portion of the roof panel 160 in the vehicle width direction (the outer region thereof in the vehicle width direction). More specifically, the inner end portion (the roof joining portion 52) of the roof side RF 50 in the vehicle width direction is joined to a part, of the roof panel 160, distanced inwardly in the vehicle width direction from the outer joining portion 63, and the outer end portion (the rail joining portion 51) of the roof side RF 50 in the vehicle width direction is joined to the roof side rail 10. Hereby, the closed section 155 including the roof side RF 50 and the roof panel 160 is formed. On this account, even if the roof panel 160 is thinned, strength and rigidity of the vicinity of the outer end portion of the roof panel 160 in the vehicle width direction (the outer region thereof in the vehicle width direction) can be supplemented. Hereby, the roof panel 160 can be easily reduced in weight. Note that the intermediate region in the vehicle width direction in the present embodiment may be a region from the center of the roof panel 160 in the vehicle width direction to parts distanced from the center by a predetermined distance toward a first end and a second end as outer ends of the roof panel 160 in the vehicle width direction. Further, the outer region in the vehicle width direction in the present embodiment may be a region including a part from the first end to an end, of the intermediate region in the vehicle width direction, on a side closer to the first end, and a part from the second end to an end, of the intermediate region in the vehicle width direction, on a side closer to the second end.

Note that the description of the second embodiment deals with a configuration in which the stiffening board 70 is not provided for simplification, but the stiffening board 70 may be added to the intermediate region in the vehicle width direction.

Supplementary Description of Embodiments

Note that the first embodiment deals with an example in which the stiffening board 70 is joined to the bottom face of the roof panel 60. However, the disclosure is not limited to this, and the vehicle-body upper structure may not include the stiffening board 70.

Further, the first embodiment deals with an example in which the stiffening board 70 is joined to bottom faces of the roof side RF 50, the roof center RF 30, and the rear header 40 as well as the bottom face of the roof panel 60, but the stiffening board 70 may be joined only to the bottom face of the roof panel 60.

Figure 7B:
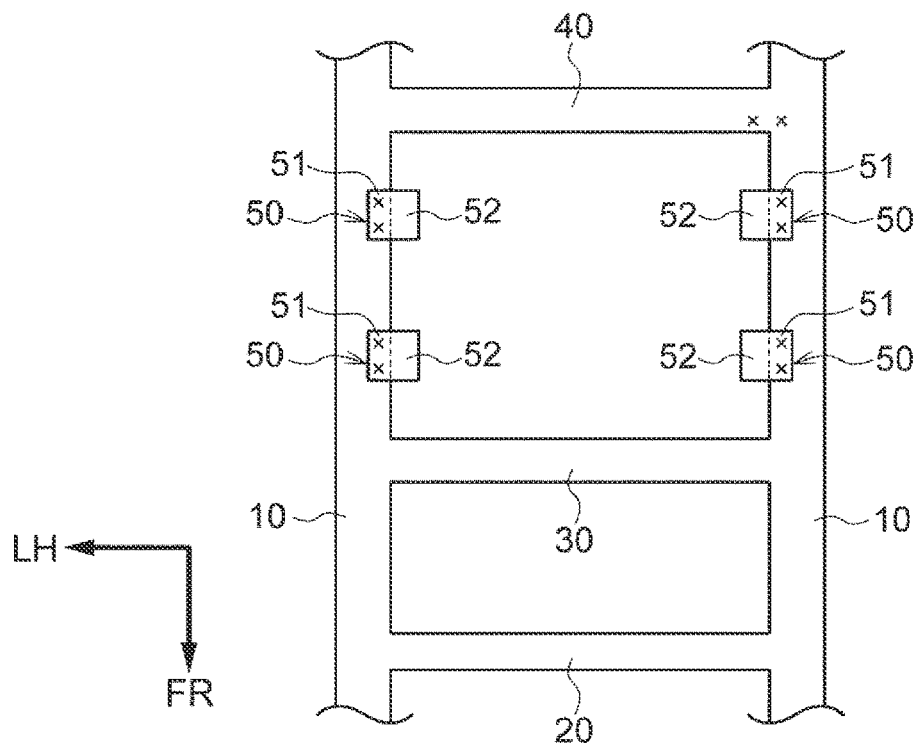
FIG. 7B is a view corresponding to FIG. 7A and is a schematic plan view illustrating a modification of the vehicle-body upper structure.

Further, the embodiment deals with an example in which, as illustrated in FIG. 7A, the roof side RF 50 is an elongated member and the roof side RF 50 is placed over the region, from the roof center RF 30 to the rear header 40, in which the stiffening board 70 is placed. However, the disclosure is not limited to this. For example, as illustrated in FIG. 7B, the roof side RF 50 may be placed partially in the region, from the roof center RF 30 to the rear header 40, in which the stiffening board 70 is placed. Further, FIG. 7B illustrates an example in which a plurality of (two) roof side RFs 50 is provided partially in the vehicle front-rear direction, but one roof side RF 50 may be provided partially in the vehicle front-rear direction.

Further, in the first embodiment and the second embodiment, the stiffening board 70 is joined with an adhesive, but the stiffening board 70 may be joined by use of a screw, for example, instead of the adhesive.

What is claimed is:

1. A vehicle-body upper structure comprising:
    a roof panel constituting an outer plate of a vehicle-body upper part, the roof panel including an outer joining portion in an outer end portion of the roof panel in a vehicle width direction;
    a roof side reinforcement provided below, in a vehicle up-down direction, an outer region of the roof panel in the vehicle width direction, the roof side reinforcement including a rail joining portion and a roof joining portion, the roof joining portion being joined to a predetermined part of the roof panel;
    a roof side rail provided in an outer end portion, in the vehicle width direction, of the vehicle-body upper part so as to extend along a vehicle front-rear direction, the roof side rail being joined to the outer joining portion of the roof panel and the rail joining portion of the roof side reinforcement; and
    an interior member joined to a connecting portion of the roof side reinforcement, the interior member (i) being different from the roof side reinforcement, (ii) extending to the roof side rail, and (iii) being joined to a portion of the roof side reinforcement having a shape projecting downward in the vehicle up-down direction, wherein
    the predetermined part is distanced from the outer joining portion of the roof panel, and the rail joining portion of the roof side reinforcement is joined to the roof side rail, so that a closed section including the roof side reinforcement and the roof panel is formed,
    a stiffening board is joined to an intermediate region of the roof panel in the vehicle width direction, the stiffening board being joined to the roof side reinforcement, and
    at a position of the roof joining portion of the roof side reinforcement, the roof panel, the roof side reinforcement, and the stiffening board are positioned on top of one another and joined to each other.

2. The vehicle-body upper structure according to claim 1, wherein the predetermined part of the roof panel is distanced inwardly in the vehicle width direction from the outer joining portion.

3. The vehicle-body upper structure according to claim 1, wherein:
    a bending portion bending downward in the vehicle up-down direction is formed in the outer region of the roof panel in the vehicle width direction; and
    the closed section formed by the roof side reinforcement includes the bending portion.

4. The vehicle-body upper structure according to claim 1, wherein the outer joining portion of the roof panel is joined to the roof side rail at a position of the rail joining portion of the roof side reinforcement, so that the closed section is formed only by the roof panel and the roof side reinforcement.

5. The vehicle-body upper structure according to claim 1, further comprising a front width-direction member and a rear width-direction member each configured to connect right and left roof side rails in the vehicle width direction, the front width-direction member and the rear width-direction member being placed sequentially from a front side in the vehicle front-rear direction, wherein the roof side reinforcement is joined to the front width-direction member at a first position inward of the rail joining portion in the vehicle width direction, and the rear width-direction member at a second position inward of the rail joining portion in the vehicle width direction.

6. The vehicle-body upper structure according to claim 1, wherein the connecting portion is positioned between the rail joining portion and the roof joining portion in the roof side reinforcement and has a generally linear shape in a section perpendicular to the vehicle front-rear direction.

7. The vehicle-body upper structure according to claim 1, further comprising a first width-direction member, a second width-direction member, and a third width-direction member each configured to connect right and left roof side rails in the vehicle width direction, the first width-direction member, the second width-direction member, and the third width-direction member being placed sequentially from a front side in the vehicle front-rear direction, wherein:

the roof panel is provided in a region from the first width-direction member to the third width-direction member; and the roof side reinforcement is provided only in a region where the roof panel has a larger curvature in a vehicle front view, out of a region from the first width-direction member to the second width-direction member and only in a region from the second width-direction member to the third width-direction member.

8. The vehicle-body upper structure according to claim 1, wherein a length of the roof side reinforcement in the vehicle width direction is shorter than a half of a length of the roof panel in the vehicle width direction.

* * * * *